US011802067B2

(12) United States Patent
Keithley et al.

(10) Patent No.: US 11,802,067 B2
(45) Date of Patent: Oct. 31, 2023

(54) NITROGEN SPARGING ASSISTED ANOXIC BIOLOGICAL WATER TREATMENT SYSTEM

(71) Applicant: United States Government, as represented by the Administrator of the U.S. EPA, Washington, DC (US)

(72) Inventors: Asher Keithley, Cincinnati, OH (US); Daniel Williams, Fairfield, OH (US); Nicholas Dugan, Wyoming, OH (US); Darren Lytle, Liberty Township, OH (US)

(73) Assignee: UNITED STATES GOVERNMENT, AS REPRESENTED BY THE ADMINISTRATOR OF THE U.S. EPA, Washington, DC (US)

( * ) Notice: Subject to any disclaimer, the term of this patent is extended or adjusted under 35 U.S.C. 154(b) by 93 days.

(21) Appl. No.: 17/192,622

(22) Filed: Mar. 4, 2021

(65) Prior Publication Data

US 2021/0276909 A1    Sep. 9, 2021

Related U.S. Application Data

(60) Provisional application No. 62/984,920, filed on Mar. 4, 2020.

(51) Int. Cl.
*C02F 9/00* (2023.01)
*C02F 1/20* (2023.01)
(Continued)

(52) U.S. Cl.
CPC ............... *C02F 9/00* (2013.01); *C02F 1/004* (2013.01); *C02F 1/20* (2013.01); *C02F 1/66* (2013.01);
(Continued)

(58) Field of Classification Search
CPC .... C02F 9/00; C02F 1/004; C02F 1/20; C02F 1/66; C02F 3/26; C02F 3/2806;
(Continued)

(56) References Cited

U.S. PATENT DOCUMENTS 5,556,536 A * 9/1996 Turk ....................... C02F 3/006
                                                          210/150
8,696,892 B2 * 4/2014 Ogawa ................... C02F 3/305
                                                          976/DIG. 386
(Continued)

FOREIGN PATENT DOCUMENTS

ES         2738952 A1 *  1/2020 ............... C02F 3/28
JP       2015000400 A  *  1/2015 ............ Y02W 10/12
WO  WO-2019204798 A1 * 10/2019 .............. C02F 1/004

OTHER PUBLICATIONS

Translation of ES2738952A1 (Year: 2020).*
(Continued)

*Primary Examiner* — Ekandra S. Miller-Cruz
(74) *Attorney, Agent, or Firm* — McCoy Russell LLP (57) ABSTRACT

Systems and methods are provided for nitrogen gas sparging assisted biological treatment of water. In one example, a denitrification system may include a media-packed column or bed through which nitrogen gas is sparged to remove dissolved oxygen from water. In some examples, an external carbon source and electron donor may be added to the media-packed column or bed to facilitate biological removal of the nitrate and/or other contaminants from the water. In this way, by relying on the sparged nitrogen gas to remove the dissolved oxygen, less of the external carbon source and electron donor may be employed as compared to denitrification systems not assisted by nitrogen gas sparging.

15 Claims, 5 Drawing Sheets

(51) Int. Cl.

| | |
|---|---|
| *C02F 3/28* | (2023.01) |
| *C02F 3/26* | (2023.01) |
| *C02F 103/06* | (2006.01) |
| *C02F 1/00* | (2023.01) |
| *C02F 1/66* | (2023.01) |
| *C02F 101/16* | (2006.01) |

(52) U.S. Cl.
CPC ............. *C02F 3/26* (2013.01); *C02F 3/2806* (2013.01); *C02F 3/2813* (2013.01); *C02F 2101/163* (2013.01); *C02F 2103/06* (2013.01); *C02F 2303/16* (2013.01); *C02F 2305/06* (2013.01)

(58) Field of Classification Search
CPC ............. C02F 3/2813; C02F 2101/163; C02F 2103/06; C02F 2303/16; C02F 2305/06; C02F 3/06; C02F 2103/007; C02F 3/305; Y02W 10/10
USPC ........................................................ 210/605
See application file for complete search history.

(56) References Cited

U.S. PATENT DOCUMENTS

2015/0315050 A1\* 11/2015 Chai ...................... C02F 3/302
　　　　　　　　　　　　　　　　　　　　　　　210/137
2019/0144318 A1\* 5/2019 Syed ........................ C02F 9/00
　　　　　　　　　　　　　　　　　　　　　　　210/631

OTHER PUBLICATIONS

Translation of JP2015000400A (Year: 2015).\*
Activated_Carbon_Filters_NPL.pdf (Year: 2014).\*
Chang_NPL_-_Carbon_Source_as_Electron_Donor_.pdf (Year: 2018).\*
Lee, K. et al., "Effects of pH and precipitation on autohydrogenotrophic denitrification using the hollow-fiber membrane-biofilm reactor," Water Research, vol. 37, No. 7, Apr. 2003, 6 pages.
Puckett, L. et al., "Nitrogen Contamination of Surficial Aquifers—a Growing Legacy," Environmental Science & Technology, vol. 45, No. 3, Dec. 20, 2011, 6 pages.
Pennino, M. et al., "Trends in Drinking Water Nitrate Violations Across the United States," Environmental Science & Technology, vol. 51, No. 22, Nov. 21, 2017, 22 pages.
Ward, M. et al., "Drinking Water Nitrate and Human Health: an Updated Review," International Journal of Environmental and Public Health, vol. 15, No. 7, Jul. 23, 2018, 31 pages.
Johnson, H. et al., "Nitrate in Streams During Winter Low-Flow Conditions as an Indicator of Legacy Nitrate," Water Resources Research, vol. 56, No. 11, Oct. 29, 2020, 19 pages.

\* cited by examiner

210. Influent
211. Nutrient chemical feeds
212. pH control chemical feed
213. Anoxic contactor
214. Packing media
215. Nitrogen gas
216. Diffuser
217. Reaeration unit
218. Aerobic filter
219. Granular media
220. Effluent

NITROGEN SPARGING ASSISTED ANOXIC BIOLOGICAL WATER TREATMENT SYSTEM

CROSS REFERENCE TO RELATED APPLICATIONS

The present application claims priority to U.S. Provisional Application No. 62/984,920, entitled "NITROGEN SPARGING ASSISTED ANOXIC BIOLOGICAL WATER TREATMENT SYSTEM," and filed on Mar. 4, 2020. The entire contents of the above-identified application are hereby incorporated by reference for all purposes.

ACKNOWLEDGMENT OF GOVERNMENT SUPPORT

This invention was made with government support from the United States Environmental Protection Agency through its Office of Research and Development. The government has certain rights in the invention.

FIELD

The present description relates generally to systems and methods for biological water treatment, particularly as assisted by nitrogen gas sparging.

BACKGROUND AND SUMMARY

Drinking water quality as regulated by the United States Environmental Protection Agency may be defined by maximum containment levels (MCLs) of various substances.

Specifically, the MCL for a given substance may correspond to a highest threshold limit for which the given substance may be present in drinking water under the Safe Drinking Water Act.

Examples of such substances may include oxidized inorganic drinking water contaminants, such as nitrate ($NO_3$), perchlorate ($ClO_4$), and chromate ($CrO_4$). For instance, the MCL of $NO_3$ nitrogen ($NO_3$—N) is 10 mg $NO_3$—N/L. $NO_3$ is considered a public health concern, as it may cause methemoglobinemia ("blue baby" syndrome) and may be associated with certain cancers, birth defects, and thyroid issues (Ward et al., Drinking Water Nitrate and Human Health: An Updated Review. *Int. J. Environ. Res. Public Health*, 2018, 15, 1557). Violations of the MCL for $NO_3$—N/L are not considered uncommon in groundwater systems in the United States, concomitant with increasing concentrations of $NO_3$ in groundwater systems overall (Johnson and Stets, Nitrate in Streams During Winter Low-Flow Conditions as an Indicator of Legacy Nitrate. *Water Resour. Res.*, 2020, 56, e2019WR026996; Pennino et al., Trends in Drinking Water Nitrate Violations Across the United States. 2017, 51, 13450-13460; Puckett et al., Nitrogen Contamination of Surficial Aquifers—A Growing Legacy. *Environ. Sci. Tech.*, 2011, 45, 839-844).

To address such violations, $NO_3$-rich source water may be passed through denitrification systems driven by any of a number of $NO_3$ treatment processes, including ion exchange, reverse osmosis, biological treatment, and the like. However, ion exchange and reverse osmosis processes may generate waste brine streams with relatively high $NO_3$ concentrations and relatively high total dissolved solids concentrations, disposal of which may be difficult and expensive.

Specifically considering biological $NO_3$ treatment processes (in which conditions may be established such that bacteria or other microorganisms naturally present in groundwater degrade target contaminants), no $NO_3$-concentrated waste brine stream may be generated therefrom, as the bacteria or other microorganisms driving the biological treatment may convert excess $NO_3$ to nitrogen gas ($N_2$ gas). Problematic to such processes is influent groundwater containing relatively high dissolved oxygen (DO) concentrations (e.g., ~8 mg DO/L), biological treatment of which may compete with biological $NO_3$ treatment. Thus, it may be desirable to remove DO in order for biological $NO_3$ treatment to proceed.

For instance, in some bacteria, appreciable $NO_3$ reduction may be triggered upon reducing DO in groundwater to relatively low levels (e.g., less than 0.5 mg DO/L). Accordingly, denitrification systems driven by biological $NO_3$ treatment processes may employ an organic carbon source and electron donor, such as acetate, to facilitate biological reduction of DO (as well as drive $NO_3$ reduction in $NO_3$-rich source water). However, electron donor/carbon source facilitated biological $NO_3$ treatment processes may lead to excess biomass, relatively rapid fouling, frequent backwashing (e.g., from the excess biomass and absence of relatively large gas bubbles), and relatively high chemical costs.

In one example, the issues described above may be addressed by a denitrification system for groundwater or surface water, the denitrification system including a media-packed column or bed through which $N_2$ gas is sparged continuously from a bottom of the media-packed column or bed to remove DO from source water, such as groundwater or surface water, a reaeration unit, and a polishing filter or bed. In this way, both DO and $NO_3$ may be limited while electron donor/carbon source consumption may be decreased relative to denitrification systems including no $N_2$ gas sparging.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for nitrogen gas ($N_2$ gas) sparging assisted biological treatment and denitrification of water. In an exemplary embodiment, a denitrification system, such as the denitrification system of FIG. 1 or FIG. 2, may reduce excess levels of nitrate ($NO_3^-$, also referred to herein as $NO_3$) and other oxidized inorganic contaminants to achieve compliance with federal drinking water regulations and improve public health. The denitrification system may include a media-packed column or bed through which $N_2$ gas may be sparged to remove dissolved oxygen (DO) from the water. In some examples, an external (e.g., added to the water) carbon source and electron donor, such as acetic acid, may be added to the media-packed column or bed to facilitate or promote biological (e.g., microbial) removal of the DO and $NO_3$ from the water. Plots illustrating $NO_3$ nitrogen ($NO_3$—N) and DO concentrations at various stages of $N_2$ gas sparging assisted biological treatment and denitrification of water are respectively shown at FIGS. 3 and 4. A plot illustrating DO concentration throughout a media-packed bed being sparged with $N_2$ gas is shown in FIG. 5. A method for operating the denitrification system is provided in FIG. 6.

In general, in source water containing elevated levels of $NO_3$, microorganisms present in the water may convert $NO_3$ to $N_2$ gas (the $N_2$ gas being readily releasable into the atmosphere or not resulting in the undesirable health effects of $NO_3$ when dissolved in water). Such a conversion reaction may desirably be implemented in an anoxic environment to trigger or induce a $NO_3$ reduction regime in the microorganisms. In exemplary embodiments described herein, the anoxic environment may be achieved by removing DO from the water via gas transfer by continuously sparging with $N_2$ gas (as used herein, "continuously" when referring to flow or sparging activity of a gas, liquid, or other fluid may describe substantially uninterrupted flow or sparging activity of the gas, liquid, or other fluid at a constant or variable rate).

As used herein, "oxic" when referring to a denitrification system or component thereof, environment, or other conditions may describe a denitrification system or component thereof, environment, or other conditions in which DO is present at greater than 2.0 mg DO/L. For example, oxic denitrification systems may not employ sparging of DO and may instead solely or primarily relies on biological reduction of DO. Correspondingly, as used herein, "anoxic" when referring to a denitrification system or component thereof, environment, or other conditions may describe a denitrification system or component thereof, environment, or other conditions in which DO is present at 2.0 mg DO/L or less. For example, anoxic denitrification systems may employ sparging of DO in combination with secondary reliance on biological reduction of DO or substantially absent biological reduction of DO whatsoever ("substantially" may be used herein as a qualifier meaning "effectively" or "practically"). Accordingly, though embodiments of the denitrification system described herein may be broadly referred to as nitrogen sparging assisted biological water treatment systems, in more specific examples, embodiments of the denitrification system may be referred to as nitrogen sparging assisted anoxic biological water treatment systems.

Biological conversion of $NO_3$ to $N_2$ gas involves a four-step sequence of reactions, which may be carried out by a single microorganism or within a consortium of microorganisms:

$$NO_3^- \rightarrow NO_2^- \rightarrow NO \rightarrow N_2O \rightarrow N_2 \qquad (1)$$

As discussed above, exemplary embodiments of the denitrification system described herein may use an external carbon source and electron donor, such as acetate derived from acetic acid, ethanol, glycerol, glycerin, etc., to support the conversion of $NO_3$ to $N_2$ gas under anoxic conditions. An amount or dose of the external carbon source and electron donor employed to eliminate $NO_3$ may depend upon a concentration of the $NO_3$, with stoichiometric considerations being determinable as an initial starting point for system optimization via the following:

$$8NO_3^- + 5CH_3COO^- + 8H^+ \rightarrow 4N_2 + 5CO_2 + 5HCO_3^- + 9H_2O \qquad (2)$$

However, equation (2) does not account for biomass synthesis and thus the amount of acetic acid added to the denitrification system may be higher in practice. Providing sufficient organic carbon (e.g., from the external carbon source and electron donor) substantially ensures that the reaction of equation (1) goes to completion and other problematic intermediate products, such as nitrite ($NO_2^-$, also referred to herein as $NO_2$), do not accumulate (Lee and Rittmann, Effects of pH and Precipitation on Autohydrogenotrophic Denitrification Using the Hollow-Fiber Membrane-Biofilm Reactor. *Water Resour. Res.*, 2003, 37, 1551-1556). In examples wherein removal of DO and anoxic conditions are achieved through gas transfer alone (e.g., as opposed to biologically), the (organic) carbon source may only be provided for conversion of the contaminant of concern (e.g., $NO_3$) and no carbon source may be provided to support initial microbial consumption of DO.

Sparging $N_2$ gas in an anoxic contactor (e.g., the media-packed column or bed) may confer several advantages over oxic denitrification systems. As a first example, approximately 15% less organic carbon source may be employed in an anoxic denitrification system relative to an oxic denitrification system, thereby reducing chemical costs and improving safety in the anoxic denitrification system relative to the oxic denitrification system (as used herein, "approximately" when referring to a numerical value may encompass a deviation of 10% or less). As a second example, less biomass may be produced in the anoxic contactor of the anoxic denitrification system relative to a column, bed, or filter of the oxic denitrification system, resulting in slower headloss accumulation and longer filter run times in the anoxic denitrification system relative to the oxic denitrification system. Further, denitrification produces $N_2$ gas (see equations (1) and (2)), relatively small bubbling of which may disrupt water flow through a media-packed bed and cause rapid headloss development. However, larger $N_2$ gas bubbles injected via a diffuser during $N_2$ gas sparging may scour and release biologically produced bubbles, which may result in even longer filter run times, reduced filter binding issues, and less frequent backwashing in the anoxic denitrification system relative to the oxic denitrification system. As such, embodiments of the (anoxic) denitrification system described herein may offer multiple operational and cost-savings advantages.

Denitrifying microorganisms may function over a relatively wide pH range (e.g., from approximately 7-9). Denitrification may both consume $H^+$ and produce alkalinity (alkalinity being a capacity of the water to neutralize acid, e.g., via equation (2)). Several processes in the anoxic contactor may impact the pH, including nutrient addition, $N_2$ gas sparging, and denitrification. Depending on chemistry of the source water (e.g., pH, dissolved inorganic carbon concentration, etc.), a concentration of $NO_3$ in the source water, selected nutrients, and $N_2$ gas and source water flow rates, the pH in the anoxic contactor may be adjusted or controlled by variously feeding an acid, base, or carbonate species. A desirable pH control strategy may be site specific (e.g., specific to a given water source, region, or water treatment facility).

Following treatment in the anoxic contactor, the water may be reaerated via a reaeration unit to increase a concentration of DO in the water such that relatively stable conditions may be maintained in a (downstream, post-denitrification) distribution system for the water. Thereafter, the water may be passed through an oxic or aerobic filter packed with granular media which also supports an active microbial community. The aerobic filter may serve to remove particles, such as sloughed biomass, as well as any residual dissolved biodegradable organic carbon in effluent from the anoxic contactor, thus yielding a biologically stabilized effluent for the distribution system. As described in detail herein, the aerobic filter may further lower the $NO_3$ concentration in the anoxic contactor effluent (e.g., via assimilation into new biomass) and convert relatively small amounts of $NO_2$ [e.g., 0.5 mg $NO_2$ nitrogen ($NO_2$—N)/L] to ammonia ($NH_3$) if $NO_2$ is indeed present in the anoxic contactor influent.

In exemplary embodiments described herein, microorganisms naturally present in the source water may grow within the two packed bed reactors (e.g., the anoxic contactor and the aerobic filter) and become acclimated during a relatively short startup period (e.g., less than one month).

Figure 1:
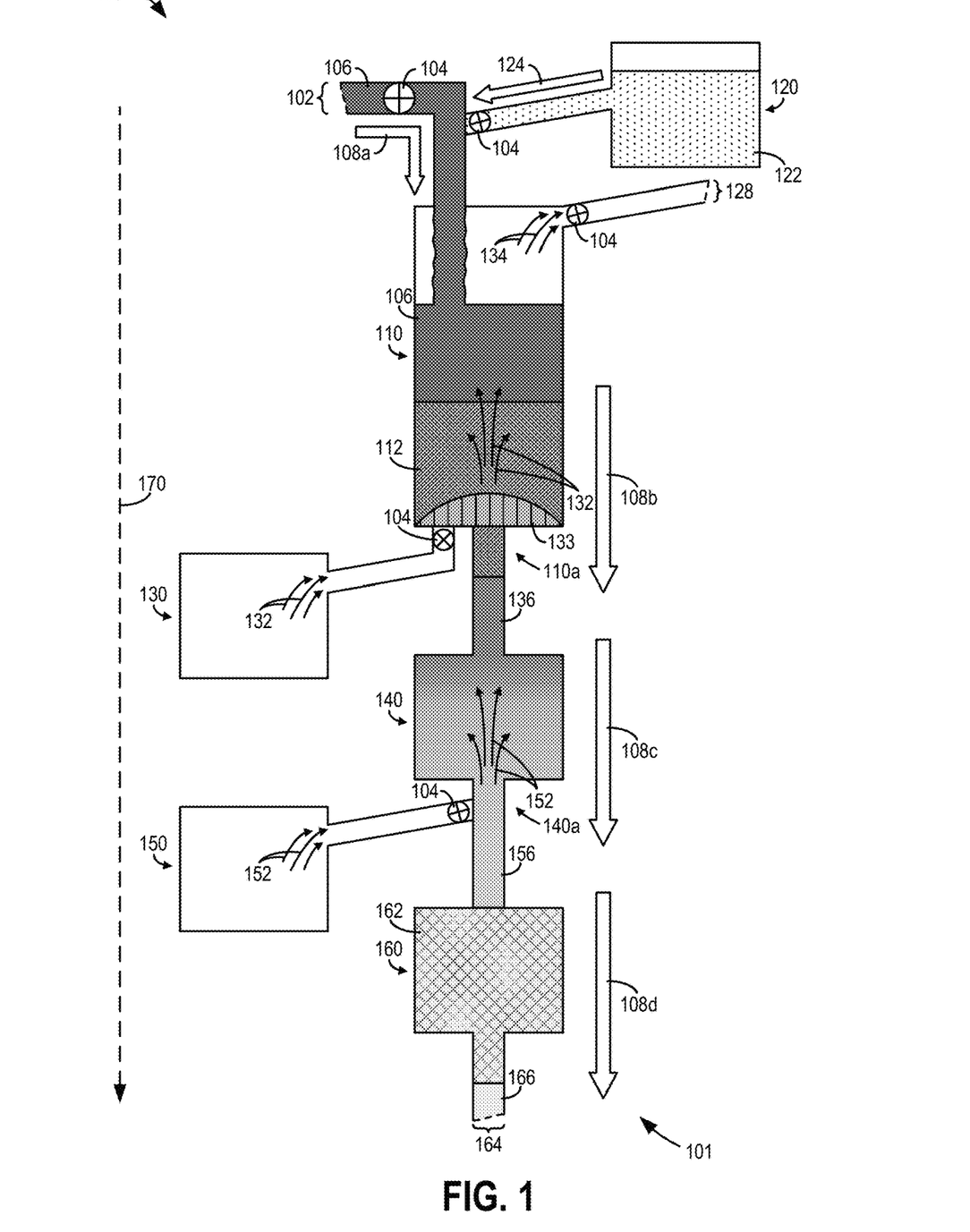
FIG. 1 shows a schematic diagram of a first exemplary denitrification system for denitrifying water, wherein denitrification of the water includes nitrogen gas ($N_2$ gas) sparging assisted biological nitrate ($NO_3$) treatment.

Referring now to FIG. 1, a schematic diagram 100 depicting a denitrification system 101 for denitrifying source water 106 is shown. In an exemplary embodiment, the denitrification system 101 may treat the source water 106 by reducing DO and $NO_3$ [and/or other oxidized inorganic contaminants or oxyanions, such as perchlorate ($ClO_4^-$, also referred to herein as $ClO_4$) and/or chromate ($CrO_4^-$, also referred to herein as $CrO_4$)] via a combination of $N_2$ gas sparging and electron donor/carbon source facilitated biological reduction. In some examples, the source water 106 may be groundwater, surface water, or any other such untreated, incompletely, or insufficiently treated water.

As shown, the source water 106 may be received at an inlet 102. When in a partially open position or a fully open position, and as indicated by an arrow 108a, one of a plurality of valves 104 may admit the source water 106 into a column or bed 110 (also referred to herein as an anoxic contactor). It will be appreciated that all of the plurality of valves 104 depicted in the schematic diagram 100 are shown in the fully open position, though one or more of the plurality of valves 104 may be adjusted to the partially open position or a closed position during differing modes of operation of the denitrification system 101. The plurality of valves 104 may include any of a number of devices or systems for controlling passage or flow of a fluid and is not restricted to any one configuration.

The source water 106 may flow through the denitrification system 101 along a direction of gravity 170 (e.g., driven by gravity and/or internal pressures applied or induced within the denitrification system 101). Specifically, and as indicated by an arrow 108b, the source water 106 may flow through packed media 112 (e.g., gravel, expanded clay, or other similar discrete media) included within the column or bed 110, e.g., at a base or bottom 110a of the column or bed 110 (the base or bottom 110a being located on a side of the column or bed 110 opposite, with respect to an axis parallel to the direction of gravity 170, to a side of the column or bed 110 through which the source water 106 enters). Within and among the packed media 112, microorganisms which are capable of DO consumption and $NO_3$ conversion may be present. Specifically, provided with an external carbon source and electron donor (as discussed below), the microorganisms may reduce DO and $NO_3$ in the source water 106, generating $N_2$ gas as a byproduct (along with an oxidized carbon species) which may be purged from the denitrification system 101.

Accordingly, one or more additives 122 may be fed, flowed, supplied, or otherwise added to the column or bed 110 from one or more respective additive sources 120 fluidically coupled to the column or bed 110 when the source water 106 is flowed to the column or bed 110. Specifically, when in a partially open position or a fully open position, one or more of the plurality of valves 104 may respectively admit the one or more additives 122 into the column or bed 110 (as indicated by an arrow 124). In some examples, at least one of the one or more additives 122 may be continuously added to the column or bed 110. In some examples, and as shown, the one or more additives 122 may be added directly to the source water 106 prior to entry of the source water 106 into the column or bed 110.

In some examples, the one or more additives 122 may include the external carbon source and electron donor (e.g., fed, flowed, supplied, or otherwise added to the column or bed 110 from a carbon and electron donor additive source included in the one or more additive sources 120). In some examples, the external carbon source and electron donor may include one or more of acetate, ethanol, glycerol, and glycerin. In an exemplary embodiment, the external carbon source and electron donor may be acetate [$C_2H_3OO^-$, provided to the column or bed 110 in the form of acetic acid ($C_2H_3OOH$)]. The acetate (or other external carbon source and electron donor) may facilitate removal of DO and $NO_3$ by providing the carbon source to be oxidized, electrons from which being donated to drive biological reduction of DO to water and $NO_3$ to $N_2$ gas.

In some examples, the one or more additives 122 may include a phosphate, another phosphorus source, or a precursor therefor (e.g., fed, flowed, supplied, or otherwise added to the column or bed 110 from a phosphorus additive source included in the one or more additive sources 120). In an exemplary embodiment, the one or more additives 122 may include orthophosphate ($PO_4^{3-}$). The orthophosphate may function as an essential nutrient (e.g., to facilitate microbial degradation of $NO_3$). In an additional or alternative embodiment, the one or more additives 122 may include phosphoric acid ($H_3PO_4$).

In some examples, the one or more additives 122 may include a pH adjustment additive, such as an acid, a base, or a carbonate species (e.g., fed, flowed, supplied, or otherwise added to the column or bed 110 from a pH adjustment additive source included in the one or more additive sources 120). The pH adjustment additive may maintain a functional pH range for the microorganisms, such as between 7 and 9. In some examples, the pH adjustment additive may be selected based on one or more of a measured pH of the source water 106, a dissolved inorganic carbon concentration of the source water 106, a concentration of $NO_3$ (or other contaminant species) in the source water 106, an amount or composition of other additives of the one or more additives 122, a flow rate of the source water 106, and a flow rate of $N_2$ gas 132.

The $N_2$ gas 132 may be fed, flowed, supplied, or otherwise added to the column or bed 110 from an $N_2$ gas source 130 fluidically coupled to the column or bed 110 when the source water 106 is flowed to the column or bed 110 (where the $N_2$ gas 132 is depicted in the schematic diagram 100 by arrows oriented along a direction of the flow of the $N_2$ gas 132). Specifically, when in a partially open or fully open position, one of the plurality of valves 104 may admit the $N_2$ gas 132 into the column or bed 110 via a diffuser 133. In some examples, the $N_2$ gas 132 may be continuously added to the column or bed 110. As shown in the schematic diagram 100, the $N_2$ gas 132 may be added directly to the packed media 112 at the base or bottom 110a of the column or bed 110 such that the $N_2$ gas may flow upwards through the packed media 112 against both the direction of gravity 170 and a direction of the flow of the source water 106. In additional or alternative examples, the source water 106 and the $N_2$ gas 132 may be flowed through the column or bed 110 such that the source water 106 and the $N_2$ gas 132 flow in the same direction.

In some examples, the diffuser 133 may generate and distribute sufficiently large bubbles of the $N_2$ gas 132 to sparge the source water 106 of at least some gases dissolved therein (e.g., DO, $N_2$ gas generated during biological reduction of $NO_3$, etc.). In an exemplary embodiment, the $N_2$ gas 132 may be sparged continuously through the column or bed 110 only when the source water 106 is flowed through the column or bed 110 during operation of the denitrification system 101, such that at least a portion of DO in the source water 106, in addition to at least a portion of $N_2$ gas generated during biological reduction of $NO_3$, may be removed. In one example, substantially all DO in the source water 106 may be sparged therefrom by the $N_2$ gas 132, such that no external carbon source and electron donor may be provided to reduce DO (however, the one or more additives 122 may still include a decreased amount of the external carbon source and electron donor to promote reduction of other inorganic contaminants, such as $NO_3$, relative to an amount used were DO to be reduced via the external carbon source and electron donor as well).

After the source water 106 is sparged, excess gas 134 including the $N_2$ gas 132 and at least the portion of DO and at least the portion of $N_2$ gas generated during biological reduction of $NO_3$ may be expelled from the column or bed 110 via a gas release outlet 128 (where the excess gas 134 is depicted in the schematic diagram 100 by arrows oriented along a direction of the flow of the excess gas 134). Specifically, when in a partially open or fully open position, one of the plurality of valves 104 may release the excess gas 134 from the column or bed 110 and into the gas release outlet 128. In examples where a remaining portion of DO is not expelled from the column or bed 110 in the excess gas 134, the remaining portion of DO may be biologically reduced by the microorganisms at the column or bed 110 or elsewhere in the denitrification system 101 (as discussed below).

In this way, by removing at least the portion of DO via $N_2$ gas sparging, less acetic acid (or other external carbon source and electron donor) may be added to the denitrification system 101 for DO reduction relative to an oxic denitrification system including no $N_2$ gas sparging and removing a like amount of DO and $NO_3$ as the (anoxic) denitrification system 101 (e.g., a lower amount of the acetic acid or other external carbon source and electron donor may be necessary to facilitate biological conversion of $NO_3$). Further, by limiting both DO and the external carbon source and electron donor, less biomass may be present in the denitrification system 101 relative to the oxic denitrification system (e.g., less of the microorganisms may be employed overall, or growth of the microorganisms may be inhibited or otherwise mitigated in the denitrification system 101 because less DO may be available to be consumed by the microorganisms in the denitrification system 101 relative to the oxic denitrification system). Additionally, by removing at least the portion of $N_2$ gas generated during biological reduction of $NO_3$, less $N_2$ gas may be accumulated in the denitrification system 101 relative to the oxic denitrification system.

The source water 106 being biologically treated in the packed media 112, biologically treated source water 136 (e.g., having reduced DO and $NO_3$ relative to the source water 106) may be expelled from the column or bed 110 and flowed through a reaeration column or unit 140 fluidically coupled to the column or bed 110 (as indicated by an arrow 108c). Air 152 [or an additional or alternative source of oxygen, such as liquid oxygen (LOX), $H_2O_2$, $O_3$, etc.] may be fed, flowed, supplied, or otherwise added to the reaeration column or unit 140 from a reaeration source 150 fluidically coupled to the reaeration column or unit 140 when the biologically treated source water 136 is flowed to the reaeration column or unit 140 (where the air 152 is depicted in the schematic diagram 100 by arrows oriented along a direction of the flow of the air 152). Specifically, when in a partially open or fully open position, one of the plurality of valves 104 may admit the air 152 into the reaeration column or unit 140. In some examples, the air 152 may be continuously added to the reaeration column or unit 140. As shown in the schematic diagram 100, the air 152 may be added at a base or bottom 140a of the reaeration column or unit 140 (the base or bottom 140a being located on a side of the reaeration column or unit 140 opposite, with respect to an axis parallel to the direction of gravity 170, to a side of the reaeration column or unit 140 through which the biologically treated source water 136 enters, such that the air 152 may flow upwards through the reaeration column or unit 140 against the direction of gravity 170).

In an exemplary embodiment, the air 152 may reaerate the biologically treated source water 136 with DO (e.g., via bubble diffusion, cascade aeration, or another similar process) following $N_2$ gas sparging assisted biological removal of initial DO from the source water 106. Excess air 152 not retained in the biologically treated source water 136 may be expelled from the denitrification system 101 via a gas release outlet (e.g., the gas release outlet 128).

The biologically treated source water 136 being reaerated in the reaeration column or unit 140, reaerated, biologically treated source water 156 (e.g., having increased $O_2$ content relative to the biologically treated source water 136) may be expelled from the reaeration column or unit 140 and flowed through a filter 162 positioned in a volume, vessel, or column 160 fluidically coupled to each of the column or bed 110 and the reaeration column or unit 140 (as indicated by an arrow 108d). In some examples, the filter 162 may include packed or granular media (e.g., anthracite, sand, expanded clay, or other discrete media). In an exemplary embodiment, the filter 162 may be an anthracite/sand packed-bed polishing filter to remove particulate matter (PM) from, or reduce PM in, the reaerated, biologically treated source water 156. In one example, the PM may include sloughed biomass from the column or bed 110 or present in the source water 106 upon receipt by the denitrification system 101.

In some examples, the filter 162 may be considered an oxic or aerobic filter, including additional microorganisms which may use the DO in the reaerated, biologically treated source water 156 reduce or otherwise remove residual contaminants therefrom, dissolved biodegradable organic carbon. In some examples, the additional microorganisms may further reduce or otherwise remove $NO_3$ or $NO_2$ remaining in the reaerated, biologically treated source water 156 from incomplete denitrification in the column or bed 110. Accordingly, reaeration via the reaeration column or unit 140 may promote additional aerobic biological treatment of the reaerated, biologically treated source water 156 in the filter 162.

The reaerated, biologically treated source water 156 having been treated for PM and residual contaminants in the volume, vessel, or column 160, fully treated source water 166 (e.g., having decreased PM content relative to the reaerated, biologically treated source water 156) may be expelled from the volume, vessel, or column 160 via an outlet 164. In this way, the source water 106 may be received by the denitrification system 101, wherein the source water 106 may be treated in a sequential, stepwise manner via the (gravel-packed) column or bed 110 continuously sparged by the $N_2$ gas 132, the reaeration column or unit 140, and the anthracite/sand (polishing) filter 162 before being expelled as the fully treated source water 166. The fully treated source water 166 may be considered a biologically stable effluent, which may be subsequently fed, flowed, supplied, or otherwise provided to a distribution system or other destination.

In some examples, $NO_3$—N in the fully treated source water 166 may be maintained below 10 mg $NO_3$—N/L by the denitrification system 101. In one example, the $NO_3$—N in the fully treated source water 166 may be maintained below 1 mg $NO_3$—N/L by the denitrification system 101. Further, in an additional or alternative example, the $NO_2$—N in the fully treated source water 166 may be maintained below 1 mg $NO_2$—N/L by the denitrification system 101. In one example, the fully treated source water 166 may be substantially free of $NO_3$ and/or other oxidized inorganic contaminants or oxyanions. Additionally, the denitrification system 101 may generate no $NO_3^-$ concentrated waste brine stream (e.g., a separate effluent from the fully treated source water 166 having an $NO_3$ concentration greater than the fully treated source water 166). In some examples, DO and $NO_3$ in the source water 106 may further be reduced by the denitrification system 101 by one or more of adjusting an amount of the external carbon source and electron donor added to the column or bed 110, lowering a hydraulic loading rate of the source water 106, and adjusting a pH of the source water 106 (e.g., prior to or after entering the denitrification system 101).

In some examples, the denitrification system 101 may be operated on a continuous basis for extended and substantially regular durations, e.g., similar to other relatively small groundwater treatment systems (as used herein, "continuous" when referring to operation of a denitrification system may describe substantially uninterrupted operation of the denitrification system for a specified duration). In one example, the denitrification system 101 may be operated on the continuous basis for approximately 9 hours per day (e.g., between 8 and 10 hours per day) and 5 days per week. During operation of the denitrification system 101 on the continuous basis, backwashing may be performed only once every 5 days (e.g., once per week when the denitrification system 101 is operated for approximately 9 hours per day and 5 days per week). In this way, backwashing may be performed in the denitrification system 101 at a lower backwashing frequency relative to the oxic denitrification system. The lower backwashing frequency may be associated with slower development of head loss through the denitrification system 101, the slower development of head loss attributed to less biomass, larger media (e.g., the packed media 112), less $N_2$ gas accumulation, and/or more evenly distributed biological activity in the denitrification system 101 relative to the oxic denitrification system (where distribution of biological activity may in turn depend upon the $NO_3$ concentration, the bed depth, and the hydraulic loading rate).

Figure 2:
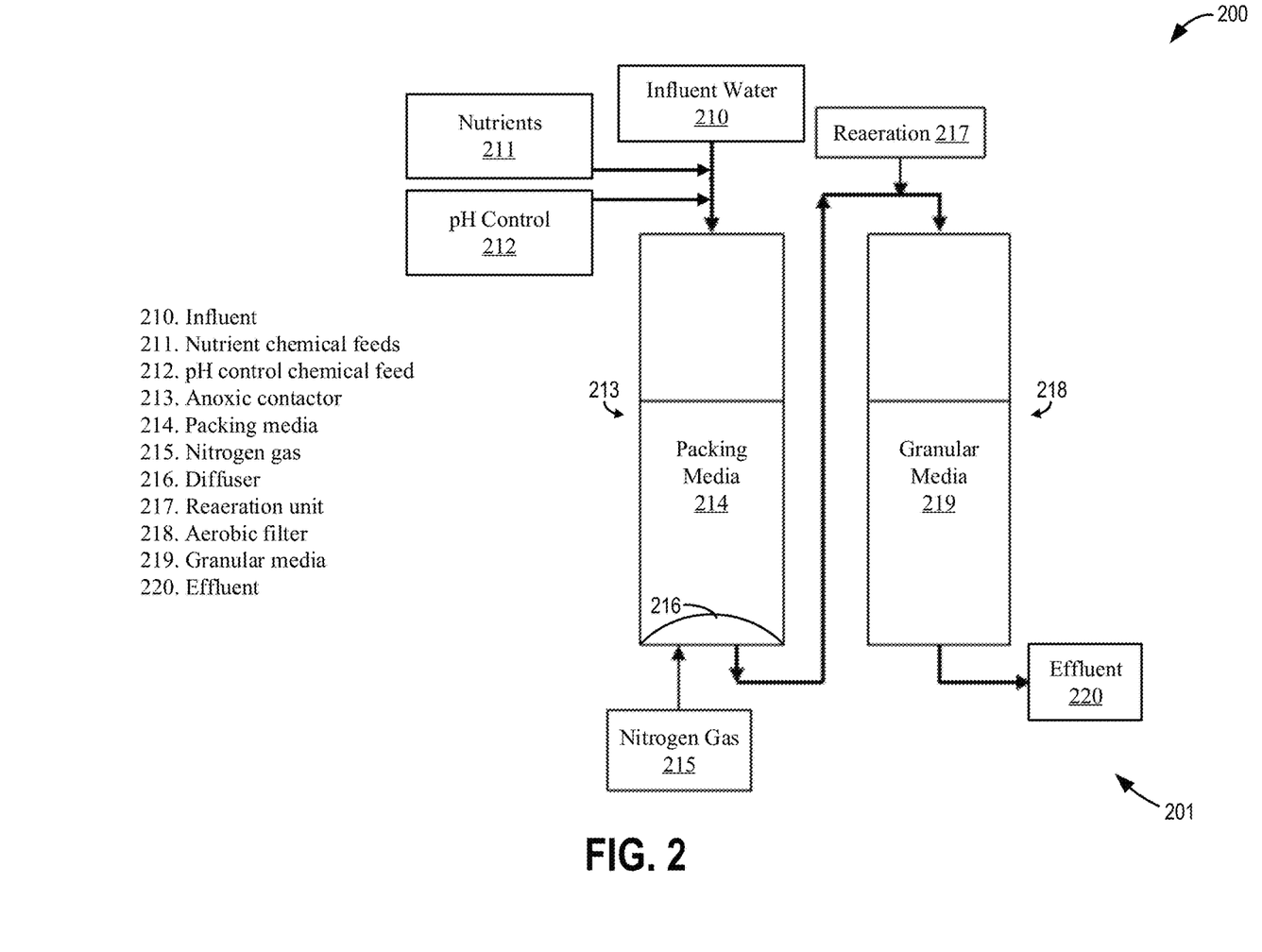
FIG. 2 shows a schematic diagram of a second exemplary denitrification system for denitrifying water, wherein denitrification of the water includes $N_2$ gas sparging assisted biological $NO_3$ treatment.

Referring now to FIG. 2, a schematic diagram 200 depicting a denitrification system 201 is shown. In some embodiments, the denitrification system 201 may be employed as an alternative to the denitrification system 101 of FIG. 1. In other embodiments, a denitrification system may be constructed with features, components, or elements from each of the denitrification system 101 and the denitrification system 201. Accordingly, features, components, and elements of the denitrification system 201 may be added, substituted, omitted, or otherwise altered based on other embodiments described herein.

As shown, influent water 210, such as groundwater, surface water, or any other such untreated, incompletely, or insufficiently treated water, may be flowed to an anoxic contactor 213 including a bed of packing media 214. Prior to or upon reaching the anoxic contactor 213, or while flowing through the anoxic contactor 213, one or more nutrients may be flowed, fed, supplied, or otherwise added to the influent water 210 via one or more nutrient chemical feeds 211, respectively, and one or more pH control additives may be flowed, fed, supplied, or otherwise added to the influent water 210 via a pH control chemical feed 212. The one or more nutrients may facilitate biological reduction of oxidized inorganic contaminants within the influent water 210 at the packing media 214, while the one or more pH control additives may stabilize a pH of the influent water 210 for the biological reduction.

To remove DO from the influent water 210, $N_2$ gas 215 may be bubbled and distributed through the packing media 214 via a diffuser 216. The $N_2$ gas 215 may flow through the anoxic contactor 213 in an opposing direction from the influent water 210. The $N_2$ gas 215 may sparge the influent water 210 of excess DO, thereby generating anoxic conditions for the biological reduction.

After being treated at the anoxic contactor 213, effluent water from the anoxic contactor 213 may be flowed to an aerobic filter 218 including a bed or packing of granular media 219. Between the anoxic contactor 213 and the aerobic filter 218, the effluent from the anoxic contactor 213 may be reaerated via a reaeration unit 217. Accordingly, upon reaching the granular media 219, the effluent from the anoxic contactor 213 may be suitable for aerobic biological reduction of residual oxidized inorganic contaminants (e.g., from incomplete denitrification at the anoxic contactor 213) and dissolved biodegradable organic carbon. The aerobic filter 218 may further filter sloughed biomass from the effluent from the anoxic contactor 213.

After being treated at the aerobic filter 218, effluent water 220 may be expelled from the denitrification system 201, e.g., to be received by a distribution system.

Figure 3:
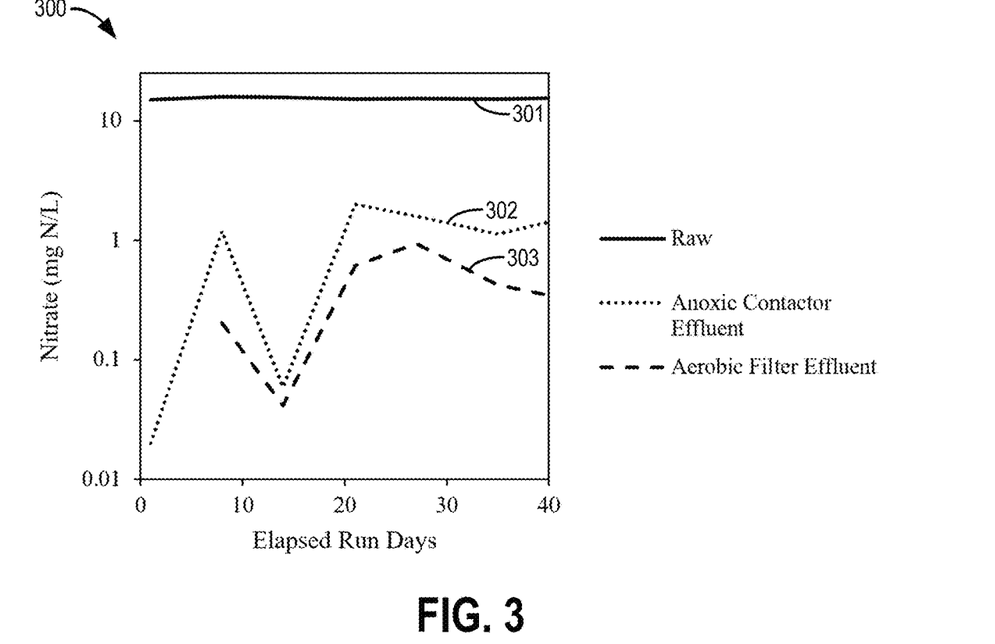
FIG. 3 shows a plot illustrating $NO_3$ nitrogen ($NO_3$—N) concentrations at various stages of $N_2$ gas sparging assisted biological $NO_3$ treatment.

Referring now to FIG. 3, a plot 300 illustrating $NO_3$—N concentrations at various stages of $N_2$ gas sparging assisted biological $NO_3$ treatment. Specifically, source water may be flowed through a denitrification system, such as the denitrification system 101 of FIG. 1 or the denitrification system 201 of FIG. 2, employing $N_2$ gas sparging assisted biological $NO_3$ treatment and at least including an anoxic contactor and an aerobic filter in sequence. As shown in plot 300, an abscissa represents a run time of the denitrification system (in days) and an ordinate represents the $NO_3$—N concentration at various stages of $N_2$ gas sparging assisted biological $NO_3$ treatment of the source water (in mg $NO_3$—N/L). The $NO_3$—N concentration in the source water is indicated by a curve 301, the $NO_3$—N concentration in an effluent expelled from the anoxic contactor is indicated by a curve 302, and the $NO_3$—N concentration in an effluent expelled from the aerobic filter is indicated by a curve 303.

Figure 4:
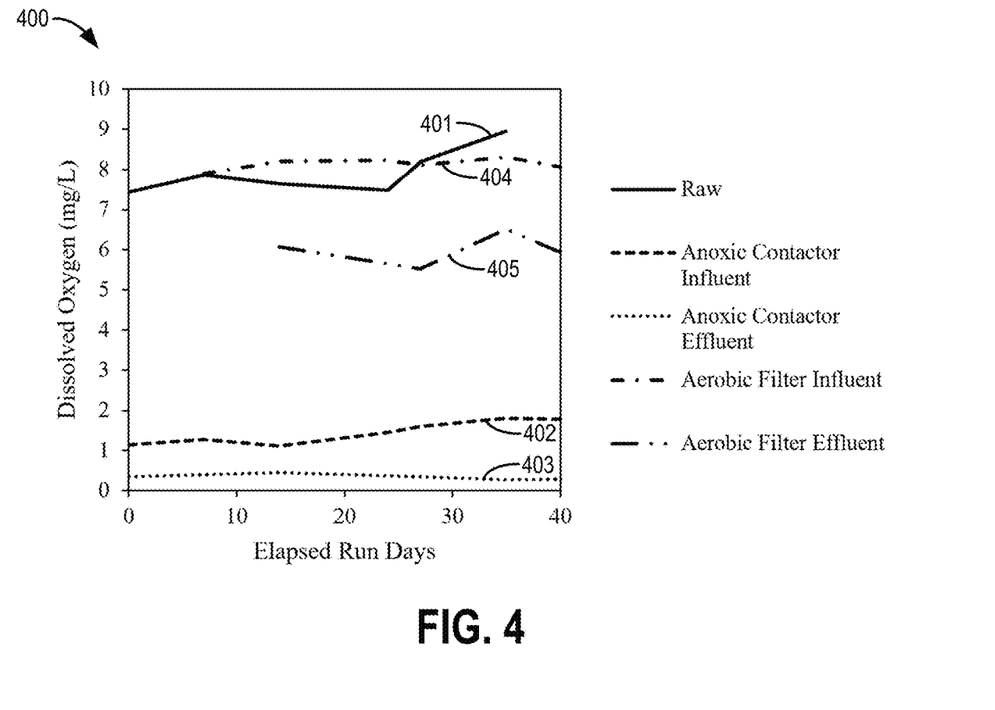
FIG. 4 shows a plot illustrating dissolved oxygen (DO) concentrations at various stages of $N_2$ gas sparging assisted biological $NO_3$ treatment.
Figure 5:
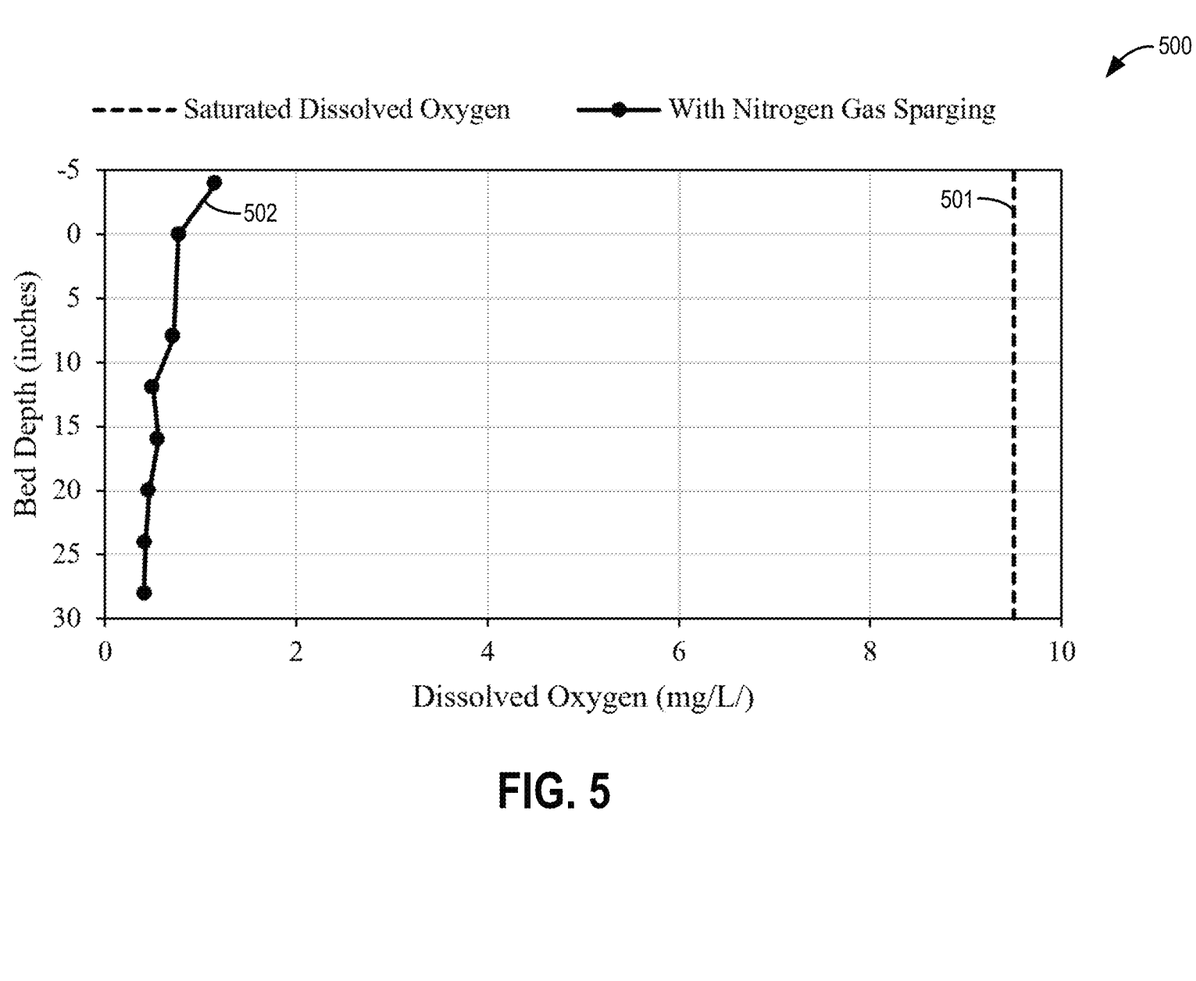
FIG. 5 shows a plot illustrating DO concentrations throughout a discrete media packing in a media-packed bed being sparged with $N_2$ gas.

Referring now to FIG. 4, a plot 400 illustrating DO concentrations at various stages of $N_2$ gas sparging assisted biological $NO_3$ treatment. Specifically, source water may be flowed through a denitrification system, such as the denitrification system 101 of FIG. 1 or the denitrification system 201 of FIG. 2, employing $N_2$ gas sparging assisted biological $NO_3$ treatment and at least including an anoxic contactor and an aerobic filter in sequence. As shown in plot 400, an abscissa represents a run time of the denitrification system (in days) and an ordinate represents the DO concentration at various stages of $N_2$ gas sparging assisted biological $NO_3$ treatment of the source water (in mg DO/L). The DO concentration in the source water is indicated by a curve 401, the DO concentration in an influent received by the anoxic contactor (e.g., at a packed bed of the anoxic contactor, following at least partial $N_2$ gas sparging of DO in the source water) is indicated by a curve 402, the DO concentration in an effluent expelled from the anoxic contactor is indicated by a curve 403, the DO concentration in an influent received by the aerobic filter is indicated by a curve 404, and the DO concentration in an effluent expelled from the aerobic filter is indicated by a curve 405.

Referring now to FIG. 5, a plot 500 illustrating DO concentrations throughout a discrete media packing in a media-packed bed being sparged with $N_2$ gas. Specifically, source water may be flowed through a denitrification system, such as the denitrification system 101 of FIG. 1 or the denitrification system 201 of FIG. 2, employing $N_2$ gas sparging assisted biological $NO_3$ treatment and at least including an anoxic contactor having the media-packed bed therein. As shown in plot 500, an abscissa represents the DO concentration of the source water (in mg DO/L) and an ordinate represents a depth of the media-packed bad (in inches, with negative values being above the media-packed bed and positive values being within the media-packed bed). A saturated DO concentration in the source water is indicated by a curve 501 and the DO concentration as the source water passes through the media-packed bed is indicated by a curve 502 (where the DO concentration is already below the saturated DO concentration upon reaching the media-packed bed due to $N_2$ gas sparging of the source water).

Data for the plots of FIGS. 3-5 was collected via the same denitrification system. Specifically, the denitrification system may be one example of a drinking water biological treatment system for removing $NO_3$ and other oxidized inorganic contaminants from groundwater via a (first stage) anoxic contactor and a (second stage) aerobic filter. The anoxic contactor may receive influent raw water with nutrients added and may be continuously sparged with $N_2$ gas. The added nutrients may include an organic carbon source and electron donor (e.g., one or more of acetic acid, ethanol, glycerol, and glycerin) and phosphorus supplied as phosphoric acid, for example, as an essential nutrient. The added nutrients may be provided to facilitate microbial degradation of oxidized inorganic contaminants including $NO_3$ and other oxyanions (e.g., $ClO_4$ and $CrO_4$).

A chemical feed system for pH control may also be included. A suitable pH control strategy may depend on site-specific factors, including chemistry of the influent raw water and a choice of the organic carbon source and electron donor.

The anoxic contactor may be a fixed-bed bioreactor packed with media (e.g., gravel, expanded clay, or other similar media). A size of the media, the bed depth, and a hydraulic loading rate may depend on site-specific characteristics, including which contaminants are present in the influent raw water.

The anoxic contactor may be continuously sparged with $N_2$ gas introduced through a diffuser at a bottom or base of a column forming the anoxic contactor so that $N_2$ gas bubbles may flow counter-current up through the water. The $N_2$ gas may remove DO from the influent raw water and may scour $N_2$ gas bubbles produced by microorganisms during denitrification. Both counter-current and co-current configurations may be used, though counter-current configurations may provide a greater DO removal efficiency.

Effluent from the anoxic contactor may be reaerated by bubble diffusion, cascade aeration, or another similar process. After the DO concentration is increased up to close to saturation (e.g., 8-10 mg DO/L), the effluent may be passed down through the aerobic filter, which may be packed with granular media. The aerobic filter may serve to remove particles, such as sloughed biomass, and may aerobically degrade reduced contaminants in the effluent, such as residual dissolved organic carbon.

In this way, the denitrification system may remove $NO_3$ and other oxyanions that may be reduced biologically, such as $ClO_4$ and $CrO_4$, while providing an environmentally friendly or "green" approach as compared to some alternative physical/chemical and current biological treatment approaches (as residual waste streams may be minimized and less essential nutrients like organic carbon may be consumed).

In the denitrification system used to collect data for the plots of FIGS. 3-5, the anoxic contactor is packed with 0.5-inch diameter gravel to abed depth of 30 inches. The anoxic contactor was fed an influent with 15-16 mg $NO_3$—N/L at a hydraulic loading rate of 1.3 or 1.9 gm/ft$^2$ and produced an effluent $NO_3$—N concentration that averaged 0.96 mg $NO_3$—N/L and ranged from 0.02-2 mg $NO_3$—N/L (as evidenced by the plot 300 of FIG. 3). Relatively little $NO_2$ was produced, with anoxic contactor effluent $NO_2$—N concentrations averaging 0.14 mg $NO_2$—N/L. Similar to $NO_3$ [which has a maximum containment level (MCL) of 10 mg $NO_3$—N/L], $NO_2$ is a regulated drinking water contaminant with a MCL of 1.0 mg $NO_2$—N/L. Accordingly, the denitrification system used to collect data for the plots of FIGS. 3-5 reduced both the $NO_3$ and $NO_2$ to within respective MCLs therefor.

The influent contained 6.5-9.5 mg DO/L and was fed counter-current to sparging $N_2$ gas through the (gravel-packed) anoxic contactor. The $N_2$ gas was >99% pure and was sparged up through the packed bed or column of the anoxic contactor at a rate of 2 SLM. Such a configuration established anoxic conditions throughout the bed depth of the packed bed or column (as evidenced by the plot 500 of FIG. 5). The DO concentration at a top of the packed bed or column was lowered from 6.5-9.5 mg DO/L to 1-2 mg DO/L (as evidenced by the plot 400 of FIG. 4 and the plot 500 of FIG. 5), such that denitrifying microorganisms therein may at least begin to actively reduce $NO_3$. The DO concentration was decreased through the anoxic contactor and was <0.5 mg DO/L in the anoxic contactor effluent (as evidenced by the plot 400 of FIG. 4).

Reaeration increased the DO concentration to 8 mg DO/L and approximately 2 mg DO/L was consumed in the aerobic filter (as evidenced by the plot 400 of FIG. 4). The aerobic filter further decreased the $NO_3$—N concentration, such that the $NO_3$—N concentration of the aerobic filter effluent (e.g., of the denitrification system as a whole) averaged 0.43 mg $NO_3$—N/L and consistently was <1 mg $NO_3$—N/L (as evidenced by the plot 300 of FIG. 3).

Figure 6:
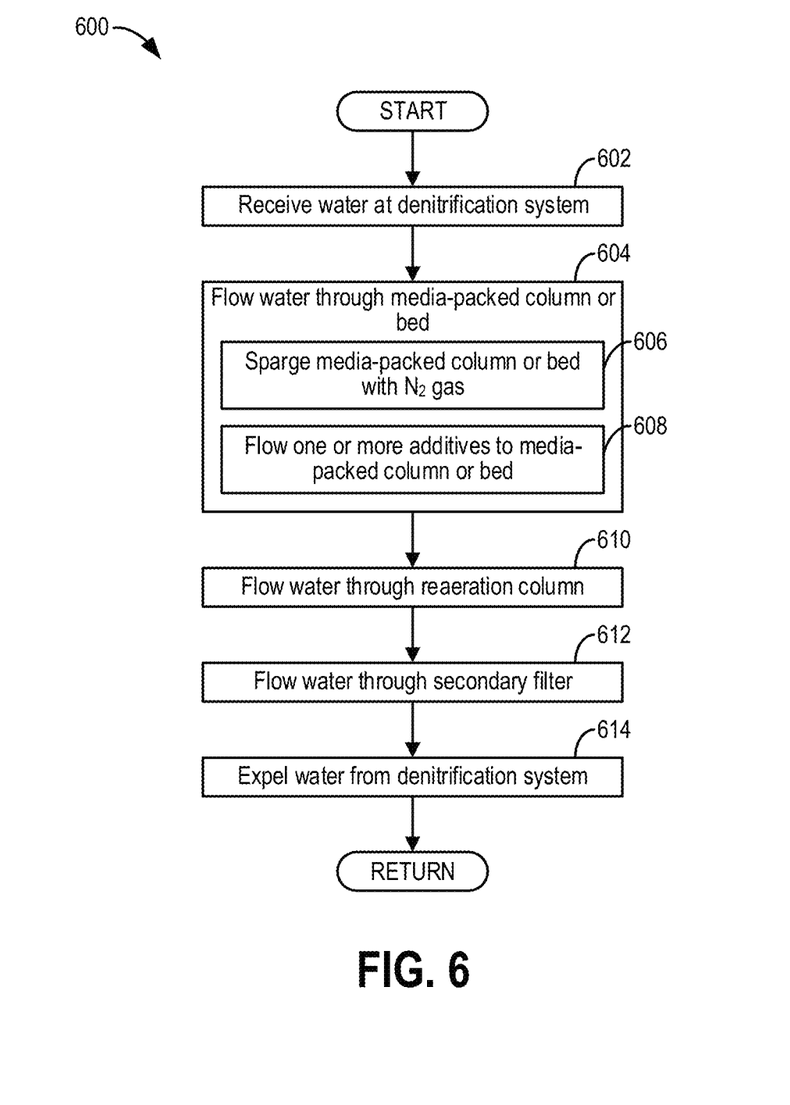
FIG. 6 shows a flow chart of a method for operating a denitrification system, such as the denitrification system of FIG. 1 or FIG. 2.

Referring now to FIG. 6, a flow chart of a method 600 is depicted for operating a denitrification system, such as the denitrification system 101 of FIG. 1 or the denitrification system 201 of FIG. 2. In an exemplary embodiment, water, such as groundwater or surface water, may be received at the denitrification system, flowed through a media-packed column or bed, a reaeration column, and a secondary filter in sequence, and expelled from the denitrification system as a treated effluent. Accordingly, it will be appreciated that method 600 may be described in relation to the components described in detail above with reference to FIG. 1 or 2. For example, the media-packed column or bed may be the column or bed 110 including the packed media 112 or the anoxic contactor 213 including the packing media 214, the reaeration column may be the reaeration column or unit 140 or the reaeration unit 217, and the secondary filter may be the filter 162 or the aerobic filter 218. It will further be appreciated that the denitrification system may be operated on a continuous basis, such that influent water may be continuously flowed to the denitrification system at a constant or variable hydraulic loading rate, treated, and expelled as the treated effluent until the denitrification system is shut down.

At 602, method 600 may include receiving the water at the denitrification system. The water may be partially treated or substantially untreated prior to being received by the denitrification system.

At 604, method 600 may include flowing the water through the media-packed column or bed. In an exemplary embodiment, the water may be flowed through the media-packed column or bed while, at 606, (continuously) sparging the media-packed column or bed with $N_2$ gas to remove DO and any excess $N_2$ gas generated by biological reduction of $NO_3$ and, at 608, flowing one or more additives to the media-packed column or bed. In one example, the one or more additives may include an external carbon source and electron donor, such as acetate provided in the form of acetic acid, to facilitate biological reduction of $NO_3$ and further DO (where biological reduction of $NO_3$ and DO may be provided by microorganisms distributed within the media-packed column or bed).

At 610, method 600 may include flowing the water through the reaeration column. Specifically, the water may be reaerated with air following $N_2$ gas sparging of DO and biological reduction of further DO as the water flows through the media-packed column or bed at 604.

At 612, method 600 may include flowing the water through the secondary filter. Specifically, the secondary filter may be an anthracite/sand filter which may filter sloughed biomass and may include additional microorganisms for biologically treating residual contaminants, such as $NO_3$ or $NO_2$ remaining from incomplete denitrification in the media-packed column or bed or dissolved biodegradable organic carbon.

At 614, method 600 may include expelling the water from the denitrification system as the treated effluent. In some examples, the treated effluent may have a lower $NO_3$ concentration (e.g., less than 1 mg $NO_3$—N/L) than the water initially received at the denitrification system (e.g., as an influent). In additional or alternative examples, the treated effluent may have less than 1 mg $NO_2$—N/L.

In this way, a denitrification system is provided for denitrifying source water via $N_2$ gas sparging assisted biological treatment. Specifically, the source water may be flowed through a media-packed column or bed while the media-packed column or bed is continuously sparged with $N_2$ gas to reduce DO in the source water. Additionally, $NO_3$ may be reduced in the source water via biological treatment (e.g., via microorganisms). An external carbon source and electron donor may be flowed to the gravel-packed column or bed to provide organic carbon and electrons to facilitate $NO_3$ reduction afforded by the biological treatment. As such, the $N_2$ gas sparging and electron donor/carbon source facilitated biological treatment may synergistically reduce DO and $NO_3$ in the source water as the source water flows through the media-packed column or bed. Accordingly, less of the external carbon source and electron donor may be added to the denitrification system relative to an oxic denitrification system including no $N_2$ gas sparging and removing a like amount of DO and $NO_3$ as the denitrification system.

In one example, a denitrification system for groundwater or surface water, the denitrification system comprising: a media-packed column or bed through which nitrogen gas is sparged continuously from a bottom of the media-packed column or bed to remove dissolved oxygen from the groundwater or surface water; a reaeration unit; and a polishing filter or bed. A first example of the denitrification system further includes wherein an external carbon source and electron donor is added to the groundwater or surface water to facilitate removal of the dissolved oxygen and nitrate from the groundwater or surface water through microbial activity. A second example of the denitrification system, optionally including the first example of the denitrification system, further includes wherein less of the external carbon source and electron donor is added to the denitrification system relative to an oxic denitrification system including no nitrogen gas sparging and removing a like amount of dissolved oxygen and nitrate as the denitrification system. A third example of the denitrification system, optionally including one or more of the first and second examples of the denitrification system, further includes wherein nitrate is removed from the groundwater or surface water via biological reduction. A fourth example of the denitrification system, optionally including one or more of the first through third examples of the denitrification system, further includes wherein the nitrogen gas is sparged continuously through the media-packed column or bed only when the groundwater or surface water is flowed through the media-packed column or bed during operation of the denitrification system. A fifth example of the denitrification system, optionally including one or more of the first through fourth examples of the denitrification system, further includes wherein the denitrification system is operated on a continuous basis. A sixth example of the denitrification system, optionally including one or more of the first through fifth examples of the denitrification system, further includes wherein nitrate nitrogen ($NO_3$—N) in effluent groundwater or surface water is maintained below 10 mg $NO_3$—N/L during operation of the denitrification system. A seventh example of the denitrification system, optionally including one or more of the first through sixth examples of the denitrification system, further includes wherein nitrite nitrogen ($NO_2$—N) in effluent groundwater or surface water is maintained below 1 mg $NO_2$—N/L during operation of the denitrification system. An eighth example of the denitrification system, optionally including one or more of the first through seventh examples of the denitrification system, further includes wherein no nitrate-concentrated waste brine stream is generated. A ninth example of the denitrification system, optionally including one or more of the first through eighth examples of the denitrification system, further includes wherein a pH control additive is added to maintain a pH of the groundwater or surface water to between 7 and 9 and/or orthophosphate is added as an essential nutrient and a corrosion inhibitor. A tenth example of the denitrification system, optionally including one or more of the first through ninth examples of the denitrification system, further includes wherein backwashing is performed in the denitrification system at a lower backwashing frequency relative to an oxic denitrification system including no nitrogen gas sparging and removing a like amount of dissolved oxygen and nitrate as the denitrification system.

In another example, a column or bed for denitrifying groundwater or surface water, the column or bed comprising: a packing of discrete media, wherein the column or bed is fluidically coupled to a nitrogen gas source, and wherein nitrogen gas from the nitrogen gas source is continuously sparged through the column or bed to remove dissolved oxygen from the groundwater or surface water. A first example of the column or bed further includes wherein the column or bed is fluidically coupled to each of a reaeration unit and a discrete media filter, column, or bed. A second example of the column or bed, optionally including the first example of the column or bed, further includes wherein the column or bed is fluidically coupled to a carbon and electron donor additive source, the carbon and electron donor additive source feeding an external carbon source and electron donor to the column or bed to facilitate removal of the dissolved oxygen and nitrate. A third example of the column or bed, optionally including one or more of the first and second examples of the column or bed, further includes wherein the column or bed has less biomass and less nitrogen gas accumulation relative to an oxic dual-media filter including no nitrogen gas sparging and removing a like amount of dissolved oxygen and nitrate as the column or bed.

In yet another example, a method for treating water containing dissolved nitrate and other oxidized inorganic contaminants amenable to biological conversion, the method comprising: feeding the water as influent into an anoxic contactor packed with media; feeding additives to the water to facilitate biological conversion of the dissolved nitrate and the other oxidized inorganic contaminants; introducing nitrogen gas through a diffuser positioned at a bottom of the anoxic contactor to sparge and remove dissolved oxygen from the water; establishing colonies of microorganisms to convert the dissolved nitrate to additional nitrogen gas within the anoxic contactor; introducing air or oxygen gas to the water in a reaeration unit; establishing colonies of microorganisms assimilating residual dissolved nitrate and consuming residual dissolved organic carbon within an aerobic filter or bed; removing particulates from the water via the aerobic filter or bed; and expelling an effluent from the aerobic filter or bed, the effluent including a lower nitrate concentration than the water fed into the anoxic contactor as the influent. A first example of the method further includes wherein sparging with the nitrogen gas in the anoxic contactor to remove the dissolved oxygen lowers a concentration of the dissolved oxygen in the water. A second example of the method, optionally including the first example of the method, further includes wherein sparging with the nitrogen gas in the anoxic contactor lowers an amount of an external carbon source and electron donor included in the additives necessary to facilitate the biological conversion of the dissolved nitrate relative to an oxic denitrification system not sparged with nitrogen gas which reduces a like amount of dissolved oxygen and nitrate. A third example of the method, optionally including one or more of the first and second examples of the method, further includes wherein water is flowed through the anoxic contactor, the reaeration unit, and the aerobic filter in sequence. A fourth example of the method, optionally including one or more of the first through third examples of the method, further includes wherein the additives include an external carbon source and electron donor to facilitate the removal of residual dissolved oxygen not removed by sparging with the nitrogen gas and the biological conversion of the dissolved nitrate.

In another representation, a method for treating groundwater or tap water, the method comprising: flowing the groundwater or tap water through a gravel-packed column or bed while continuously sparging the gravel-packed column or bed with nitrogen gas; flowing the groundwater or tap water through a reaeration column; and flowing the groundwater or tap water through an anthracite/sand polishing filter, wherein dissolved oxygen in the groundwater or tap water is reduced via the continuously sparged nitrogen gas.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for treating water containing dissolved nitrate and other oxidized inorganic contaminants amenable to biological conversion, the method comprising:
feeding the water as influent water into an anoxic contactor packed with media and treating the influent water within the anoxic contactor to provide denitrified water;
feeding additives to the influent water to facilitate the biological conversion of the dissolved nitrate and the other oxidized inorganic contaminants;
introducing nitrogen gas through a diffuser positioned at a bottom of the anoxic contactor to sparge and remove dissolved oxygen from the water, the diffuser located inside the anoxic contactor and located within the media;
establishing colonies of microorganisms to convert the dissolved nitrate to additional nitrogen gas within the anoxic contactor;
introducing air or oxygen gas to the denitrified water in a reaeration unit to provide reaerated water;
establishing colonies of microorganisms assimilating residual dissolved nitrate and consuming residual dissolved organic carbon within an aerobic filter or bed;
removing particulates from the reaerated water via the aerobic filter or bed; and
expelling an effluent from the aerobic filter or bed, the effluent including a lower nitrate concentration than the influent water fed into the anoxic contactor.

2. The method of claim 1, wherein sparging with the nitrogen gas in the anoxic contactor lowers a concentration of the dissolved oxygen in the water.

3. The method of claim 1, wherein sparging with the nitrogen gas in the anoxic contactor to remove the dissolved oxygen lowers an amount of an external carbon source and electron donor included in the additives, the external carbon source and the electron donor facilitating the biological conversion of the dissolved nitrate and of the dissolved oxygen, relative to an oxic denitrification system not sparged with nitrogen gas, and wherein the biological conversion of the dissolved nitrate in the anoxic contactor is configured to reduce a like amount of dissolved oxygen and nitrate as the oxic denitrification system.

4. The method of claim 1, wherein the water is flowed through the anoxic contactor, the reaeration unit, and the aerobic filter or bed in sequence.

5. The method of claim 1, wherein the additives include an external carbon source and electron donor to facilitate removal of residual dissolved oxygen not removed by sparging with the nitrogen gas and the biological conversion of the dissolved nitrate.

6. A method for treating water with a denitrification system, the method comprising:
flowing the water as influent water through a media-packed column or bed in a denitrification vessel and treating the influent water to provide denitrified water;
continuously sparging $N_2$ gas through the media-packed column or bed to remove dissolved oxygen from the influent water, wherein the sparging is achieved via a diffuser positioned within the media-packed column or bed;
flowing the denitrified water through a reaeration unit to provide reaerated water; and
flowing the reaerated water through a polishing filter or bed.

7. The method of claim 6, wherein flowing the influent water, denitrified water and the reaerated water through the denitrification system is along a direction of gravity.

8. The method of claim 6, further comprising adding an external carbon source and electron donor to the water to facilitate removal of the dissolved oxygen and nitrate from the through microbial activity.

9. The method of claim 6, further comprising flowing an additive with the influent water through the media-packed column or bed.

10. The method of claim 9, wherein the additive is an orthophosphate.

11. The method of claim 9, wherein the additive is phosphoric acid.

12. The method of claim 6, further comprising adding a pH control additive to the influent water to maintain the pH between 7 and 9.

13. A method for denitrifying groundwater or surface water, the method comprising:
fluidically coupling a media-packed column or bed in a denitrification vessel to a source of the groundwater or the surface water and treating the source of the ground water or the surface water to provide denitrified water;
fluidically coupling the media-packed column or bed to a nitrogen gas source via a diffuser positioned within the media-packed column or bed;
continuously sparging nitrogen gas from the nitrogen gas source through the media-packed column or bed to remove dissolved oxygen from the groundwater or the surface water; and
fluidically coupling a reaeration unit to the media-packed column or bed to introduce air and/or oxygen gas to the denitrified water to provide reaerated water.

14. The method of claim 13, further comprising fluidically coupling a discrete media filter to the media-packed column or bed.

15. The method of claim 13, further comprising fluidically coupling a carbon and electron donor additive source to the media-packed column or bed to facilitate removal of the dissolved oxygen and nitrate.

* * * * *